Patented July 23, 1929.

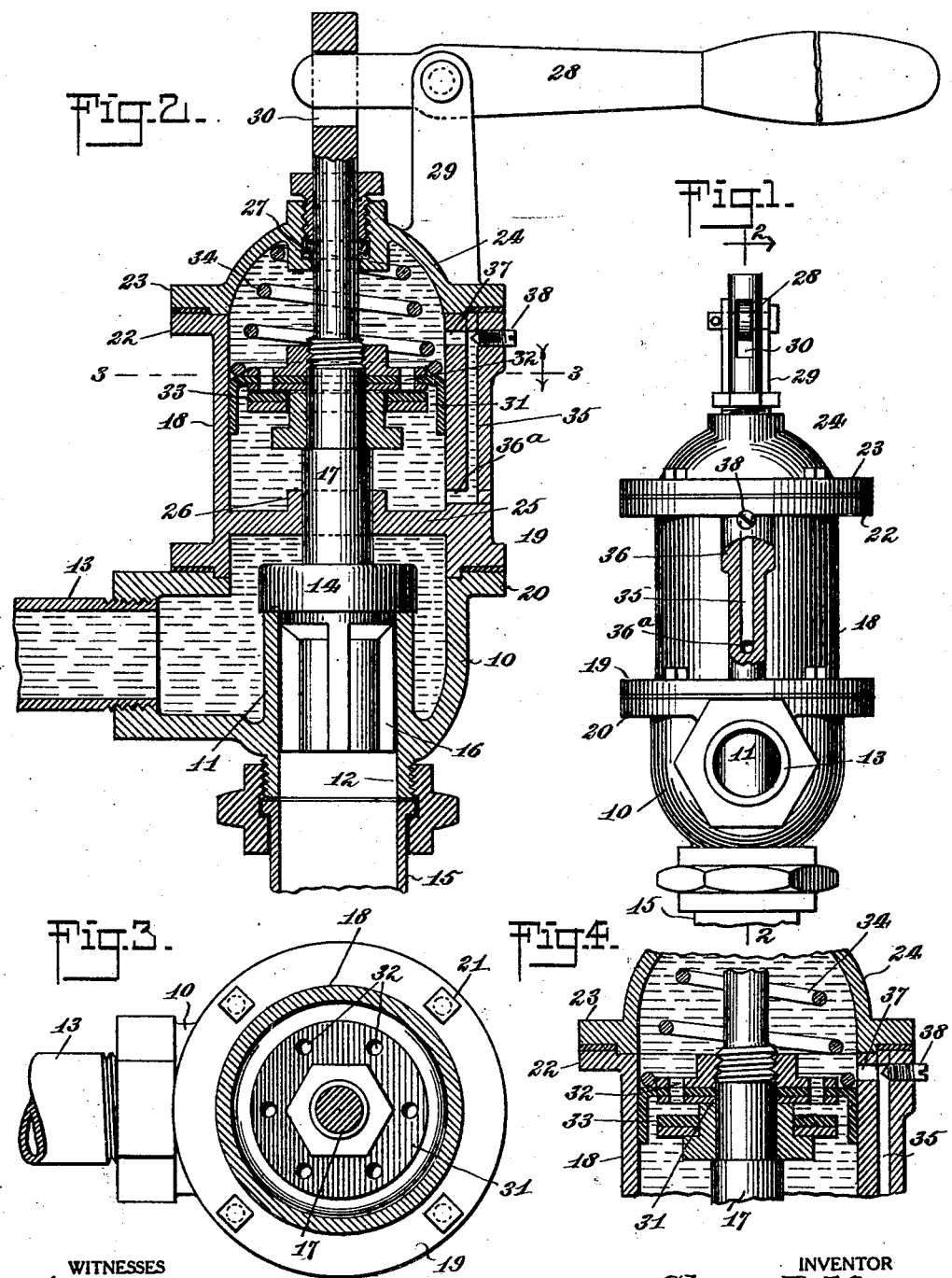

1,722,155

UNITED STATES PATENT OFFICE.

CLAUS D. MYER, OF UNION CITY, NEW JERSEY, ASSIGNOR TO MYER FLUSH VALVE CO., INC., OF UNION CITY, NEW JERSEY, A CORPORATION OF NEW JERSEY.

FLUSH VALVE.

Application filed August 6, 1926. Serial No. 127,670.

The present invention is concerned with the provision of a flush valve of the character commonly employed in water pressure lines and in which means are provided for retarding the return of a valve after it has been unseated.

This type of pressure flush valve has been subject to several disadvantages. In the first place, in most of them, the valve chamber is formed with an expansible wall in the nature of a rubber diaphragm; such diaphragms may work efficiently when only clean filtered water is passing through the valve. For marine purposes however, and in various other connections where the water passing through the valve is dirty, or carries sand or silt, the high water pressures grind the sand or other foreign matter into the diaphragm, and the diaphragm is quickly worn through.

A further disadvantage of the flush valves now commonly employed is the fact that no satisfactory means has ever been provided for accurately regulating the time interval for which the valve is open, or for predetermining the amount of time which it will take for the valve to reseat.

In accordance with the present invention I have provided a valve which is particularly suitable for use in marine work, on shipboard, at docks, or in any location where dirty water is present in the pressure line. My valve entirely eliminates the use of the diaphragm, and substitutes therefor a metal wall capable of resisting the attacks of foreign matter which may be forced against it by the pressure of the water. The invention also provides readily adjustable means for regulating the interval between the opening and closing of the valve, or regulating the amount of time which it takes the valve to reseat after it has been released.

Further objects of the invention are to provide a valve of simple, practical construction, which will be rugged, durable and efficient in use, which may be manufactured with comparative economy, which may be operated with facility, and which is extremely unlikely to become inoperative due to the passage of foreign matter therethrough.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a view in side elevation of a flush valve embodying the present invention, part of the cylinder being broken away to disclose the bypass passageway.

Fig. 2 is an enlarged view in vertical section through the valve on the line 2—2 of Fig. 1.

Fig. 3 is a transverse sectional view on the line 3—3 of Fig. 2.

Fig. 4 is a vertical sectional detail through the upper end of the cylinder showing the retarding piston in its uppermost position.

In the drawings I have used the numeral 10 to designate a valve casing formed with an inwardly turned valve seat 11 communicating with an external nipple 12. Water under pressure enters the valve casing 10 through an inlet pipe 13 and when the valve 14 is open, passes into the tank to be flushed through an outlet pipe 15 connected to the nipple 12. Valve 14 coacting with the seat 11 is preferably guided by a depending spider 16.

The stem 17 of the valve passes upwardly through a closed cylinder 18 secured in any appropriate manner, to the open top of the valve casing 10. It will be noted that the lower end of the cylinder is flanged at 19, and bolted or otherwise secured as at 21 to a flange 20 on the valve body 10. The upper flanged end 22 of the cylinder 18 mates with a flange 23 on a dome-like cylinder head 24. The lower cylinder head 25 constitutes also the top wall of the valve chamber, and is formed with a boss 26 in which the valve stem 17 loosely fits.

The stem 17 is so loosely fitted into boss 26 that water may leak around the stem into the cylinder 18, the cylinder becoming completely filled with water after a few operations of the valve.

The dome-like cylinder head 24 is provided with a stuffing box 27 in which the upper end of the valve stem is guided. Any suitable means may be provided for operating the valve stem, such for instance as the hand lever 28 pivoted between ears 29 carried by the cylinder head 24 and working in a slot 30 in the upper end of the stem.

Mounted upon the valve stem 17 is a retarding piston 31 having openings 32 therein. A flat check valve 33 at the under side of the piston prevents flow of water upwardly through the openings 32 as the piston moved downwardly, but permits free passage of water through the piston as the valve stem 17 is lifted.

A coiled expansion spring 34 encircling the valve stem 17 bears against the piston 31 and tends to urge the valve into the seated position of Fig. 2.

A restricted water passage 35 formed in a laterally offset portion 36 of the cylinder 18 communicates at its lower end through a passage 36ª with the bottom of the cylinder 18 at a point below the piston. Passageway 35 is connected to the upper end of the cylinder at a point above the piston by a restricted passageway 37 aligned with a needle valve 38 mounted in the wall of the offset 36.

The operation of the device is substantially as follows: water under pressure always fills the valve chamber and will leak around the valve stem into the cylinder 18 until this cylinder, as well as the passages 35, 36ª and 37 are completely filled. To unseat the valve 14, the lever 28 is depressed, lifting the valve against the action of its spring 34. As the valve is lifted, piston 31 will move upwardly with the valve stem, check valve dropping away from the openings 32 and permitting free upward movement of the retarding piston.

As the handle 28 is released, the spring 34 will tend to reseat the valve. Piston 31 however, is retarded in its downward movement due to the fact that the check valve 33 blocks passages 32. Consequently, downward movement of the piston is regulated by the rate at which water may be forced through the passages 36ª, 35 and 37 from the bottom of the cylinder to the top thereof, or from one side of the piston to the other. The rate of flow through passage 35 is predetermined of course by the cross sectional area of the passage. By the simple expedient of adjusting the needle valve 38 the rate of flow may be accurately predetermined and any desired amount of time may elapse between the release of the handle 28 and the reseating of the valve 14, it being borne in mind that until the valve reseats, water under pressure will continue to flow out through the pipe 15.

The lower metallic cylinder head 25 takes the place of the rubber diaphragm ordinarily employed, and will of course wear much better than the diaphragm, inasmuch as it is not subject to damage by the action of silt, sand or other foreign matter passing through the pressure line.

The particular details of construction of the piston 31 may be considerably varied, and in fact numerous changes and alterations might be made in the general form and arrangements of the parts described without departing from the invention. Hence I do not wish to limit myself to the precise details set forth, but shall consider myself at liberty to make such changes and alterations as fairly fall within the spirit and scope of the appended claims.

I claim:

1. A flush valve for pressure lines including a valve casing having inlet and outlet ports therein and a valve seat intermediate the ports, a cylindrical valve bonnet having a closed lower end secured to and constituting the top of the valve casing, a valve in the casing cooperating with the seat, and a valve stem working loosely through an opening in the closed bottom of the cylindrical bonnet, a dome closing the top of the cylindrical bonnet and having a stuffing box therein through which the valve stem works, a piston secured to the stem within the bonnet and a check valve associated with the piston permitting free flow of liquid through the piston as the valve is opened and preventing flow therethrough as the valve is closed, a spring above the piston acting thereon to close the valve, and by-pass means connecting the water spaces at opposite sides of the piston.

2. A flush valve for pressure lines including a valve casing having inlet and outlet ports therein and a valve seat intermediate the ports, a cylindrical valve bonnet having a closed lower end secured to and constituting the top of the valve casing, a valve in the casing cooperating with the seat, and a valve stem working loosely through an opening in the closed bottom of the cylindrical bonnet, a dome closing the top of the cylindrical bonnet and having a stuffing box therein through which the valve stem works, a piston secured to the stem within the bonnet and a check valve associated with the piston permitting free flow of liquid through the piston as the valve is opened and preventing flow therethrough as the valve is closed, a spring above the piston acting thereon to close the valve, and by-pass means connecting the water spaces at opposite sides of the piston, said by-pass passageway being formed in the wall of the cylindrical bonnet.

3. A flush valve for pressure lines including a valve casing having inlet and outlet ports therein and a valve seat intermediate the ports, a cylindrical valve bonnet having a closed lower end secured to and constituting the top of the valve casing, a valve in the casing cooperating with the seat, and a valve stem working loosely through an opening in the closed bottom of the cylindrical bonnet, a dome closing the top of the cylindrical bonnet and having a stuffing box therein through which the valve stem works, a piston secured to the stem within the bonnet and a check valve associated with the piston permitting free flow of liquid through the piston as the valve is opened and preventing flow therethrough as the valve is closed, a spring above the piston acting thereon to close the valve, and by-pass means connecting the water spaces at opposite sides of the piston, said by-pass passageway being formed in the wall of the cylindrical bonnet, and a needle valve adjustable from the exterior of the bonnet regulating the flow of water through the by-pass.

4. A flush valve for pressure lines including a valve casing having inlet and outlet ports therein and a valve seat intermediate the ports, a cylindrical valve bonnet having a closed lower end secured to and constituting the top of the valve casing, a valve in the casing cooperating with the seat, and a valve stem working loosely through an opening in the closed bottom of the cylindrical bonnet, a dome closing the top of the cylindrical bonnet and having a stuffing box therein through which the valve stem works, a piston secured to the stem within the bonnet and a check valve associated with the piston permitting free flow of liquid through the piston as the valve is opened and preventing flow therethrough as the valve is closed, a spring above the piston acting thereon to close the valve, and by-pass means connecting the water spaces at opposite sides of the piston, a ring secured to the valve stem below the piston, said check valve comprising a floating ring working between the piston and the above mentioned ring and acting to seal openings in the piston as the latter moves in a direction to close the main valve.

CLAUS D. MYER.